United States Patent
Patel et al.

(10) Patent No.: US 9,325,269 B1
(45) Date of Patent: Apr. 26, 2016

(54) TWO STAGE FLUX SWITCHING MACHINE FOR AN ELECTRICAL POWER GENERATION SYSTEM

(71) Applicant: Hamilton Sundstrand Corporation, Charlotte, NC (US)

(72) Inventors: Dhaval Patel, Loves Park, IL (US); Andreas C. Koenig, Machesney Park, IL (US); Todd A. Spierling, Byron, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 14/542,981

(22) Filed: Nov. 17, 2014

(51) Int. Cl.
*H02P 9/10* (2006.01)
*H02P 9/14* (2006.01)
*H02P 9/30* (2006.01)
*H02K 7/20* (2006.01)
*H02K 21/26* (2006.01)
*H02P 6/18* (2006.01)

(52) U.S. Cl.
CPC . *H02P 9/302* (2013.01); *H02K 7/20* (2013.01)

(58) Field of Classification Search
USPC ............... 322/59; 318/400; 310/154
See application file for complete search history.

(56) References Cited

U.S. PATENT DOCUMENTS

| | | | | |
|---|---|---|---|---|
| 6,371,221 B1* | 4/2002 | Harrigan | ............... | E21B 4/04 175/26 |
| 8,076,811 B2 | 12/2011 | Zhu et al. | ............... | 310/154.11 |
| 8,294,401 B2* | 10/2012 | Pollock | ............... | H02P 6/10 318/400.32 |
| 8,353,336 B2* | 1/2013 | Neuhaus | ............... | E21B 4/04 166/65.1 |
| 8,471,510 B2* | 6/2013 | Pollock | ............... | H02P 6/10 318/400.34 |
| 8,970,146 B2* | 3/2015 | Pollock | ............... | H02P 6/18 318/400.01 |
| 2007/0046225 A1* | 3/2007 | Ahmed | ............... | E21B 43/128 318/400.41 |
| 2010/0206554 A1* | 8/2010 | Neuhaus | ............... | E21B 4/04 166/244.1 |
| 2010/0301789 A1* | 12/2010 | Pollock | ............... | H02P 25/083 318/400.23 |
| 2011/0037422 A1* | 2/2011 | Pollock | ............... | H02P 6/10 318/400.34 |
| 2011/0285332 A1* | 11/2011 | Pollock | ............... | H02P 6/18 318/400.02 |
| 2014/0239763 A1* | 8/2014 | Raminosoa | ............... | H02K 1/2773 310/154.44 |
| 2015/0028718 A1* | 1/2015 | Raminosoa | ............... | H02K 1/22 310/216.105 |
| 2015/0097372 A1* | 4/2015 | Patel | ............... | H02K 19/12 290/31 |
| 2015/0115757 A1* | 4/2015 | Reddy | ............... | H02K 21/12 310/154.26 |

OTHER PUBLICATIONS

K.N. Ochije et al., "Design/Performance of a Flux Switching Generator System for Variable Speed Applications", IEEE, 2005; IAS 2005; pp. 1567-1574.
John F. Bangura; "Design of High-Power Density and Relatively High-Efficiency Flux-Switching Motor", IEEE Transactions on Energy Conversion, vol. 21, No. 2, Jun. 2006; pp. 416-425.

* cited by examiner

*Primary Examiner* — Pedro J Cuevas
(74) *Attorney, Agent, or Firm* — Locke Lord LLP; Scott D. Wofsy; Daniel J. Fiorello

(57) ABSTRACT

An electrical power generation system includes a flux switching machine (FSM) including an FSM rotor operatively connected to an FSM stator, the FSM rotor operatively connected to a shaft, wherein the FSM includes an electrical input/output (i/o) in electrical communication with the FSM stator, and a permanent magnet machine (PMM) including a PMM rotor operatively connected to a PMM stator, the PMM rotor operatively connected to a the shaft, wherein the PMM is electrically connected to the FSM.

15 Claims, 2 Drawing Sheets

TWO STAGE FLUX SWITCHING MACHINE FOR AN ELECTRICAL POWER GENERATION SYSTEM

BACKGROUND

1. Field

The present disclosure relates to electrical machines, more specifically to motors/generators.

2. Description of Related Art

Traditional motors/generators utilize a rotor, which contains a set of magnets or an electromagnet, disposed in an stator containing a multi (typically three) phase winding such that electromagnetic interaction between the rotor and the stator causes the rotor to move relative to the stator or motion of the rotor relative to the stator to induce a voltage in the stator. In some cases, the magnets or electromagnet are installed in the stator and the multi phase winding is installed in the rotor. In a system with an electromagnet an excitation system is required to energize the electromagnet.

In the case of aircraft generators, to be self-sustaining and capable of shutoff, the rotor includes an electromagnet for selectively creating a field to induce a voltage in the stator when rotated; excitation energy can be supplied from a brushless exciter drive. The brushless exciter drive includes a permanent magnet generator (PMG), controller, and exciter operatively connected to an engine. The flow of power is such that the PMG sources AC power, which is rectified and conditioned by the controller, which sources the exciter stator with DC power. The excitation energy is converted by the exciter into AC power on the exciter rotor and requires rectification via rotating diodes, prior to application to the electromagnet on the rotor. The rotating diode is the most likely component in the system to fail and therefore limits the robustness of the system.

Such conventional methods and systems have generally been considered satisfactory for their intended purpose. However, there is still a need in the art for improved electrical machines and associated systems that are self-sustaining. The present disclosure provides a solution for this need.

SUMMARY

In at least one aspect of this disclosure, an electrical power generation system includes a flux switching machine (FSM) including a FSM rotor operatively connected to a FSM stator, the FSM rotor operatively connected to a shaft, wherein the FSM includes an electrical input/output (i/o) in electrical communication with the FSM stator. The FSM stator can include both an electromagnet for creating a magnetic field and multi phase winding to produce power. The FSM rotor can include a steel rotor, which contains a number of rotor poles. The system can also include a permanent magnet machine (PMM) including a PMM rotor operatively connected to a PMM stator, the PMM rotor operatively connected to the shaft, wherein the PMM is electrically connected to the FSM. In certain embodiments, an FSM with fixed magnets can be substituted in place of a traditional PMM.

The PMM stator can be electrically connected to the FSM stator. The PMM can be electrically connected to the FSM through a controller. The controller can include a rectifier for rectifying energy between the PMM and the FSM.

The controller can include a power converter for modifying the voltage and/or current of energy between the PMM and the FSM. The power converter can include a DC to DC converter connected to the rectifier for modifying the voltage input to the FSM. Alternatively a controlled AC to DC active rectifier can be included instead of the rectifier connected to the DC to DC power converter. The controller can include a voltage regulator operatively connected to the power converter for controlling the power converter voltage output.

The system can further include a signal sensor operatively connected to the electrical i/o of the FSM, wherein the voltage regulator is connected to the sensor and is configured to provide feedback to the power converter based on the at least one characteristic of the signal. The controller can be stationary relative to the FSM rotor.

In at least one aspect of this disclosure, an electrical power generation system includes a flux switching machine (FSM) including an FSM rotor operatively connected to an FSM stator, the FSM rotor operatively connected to a first shaft, wherein the FSM includes an electrical input/output (i/o) in electrical communication with the FSM stator, and a permanent magnet machine (PMM) including a PMM rotor operatively connected to a PMM stator, the PMM rotor operatively connected to a second shaft, wherein the PMM is electrically connected to the FSM. The first shaft and the second shaft can be mechanically coupled or can be the same shaft. The rectifier can be stationary relative to the FSM rotor.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
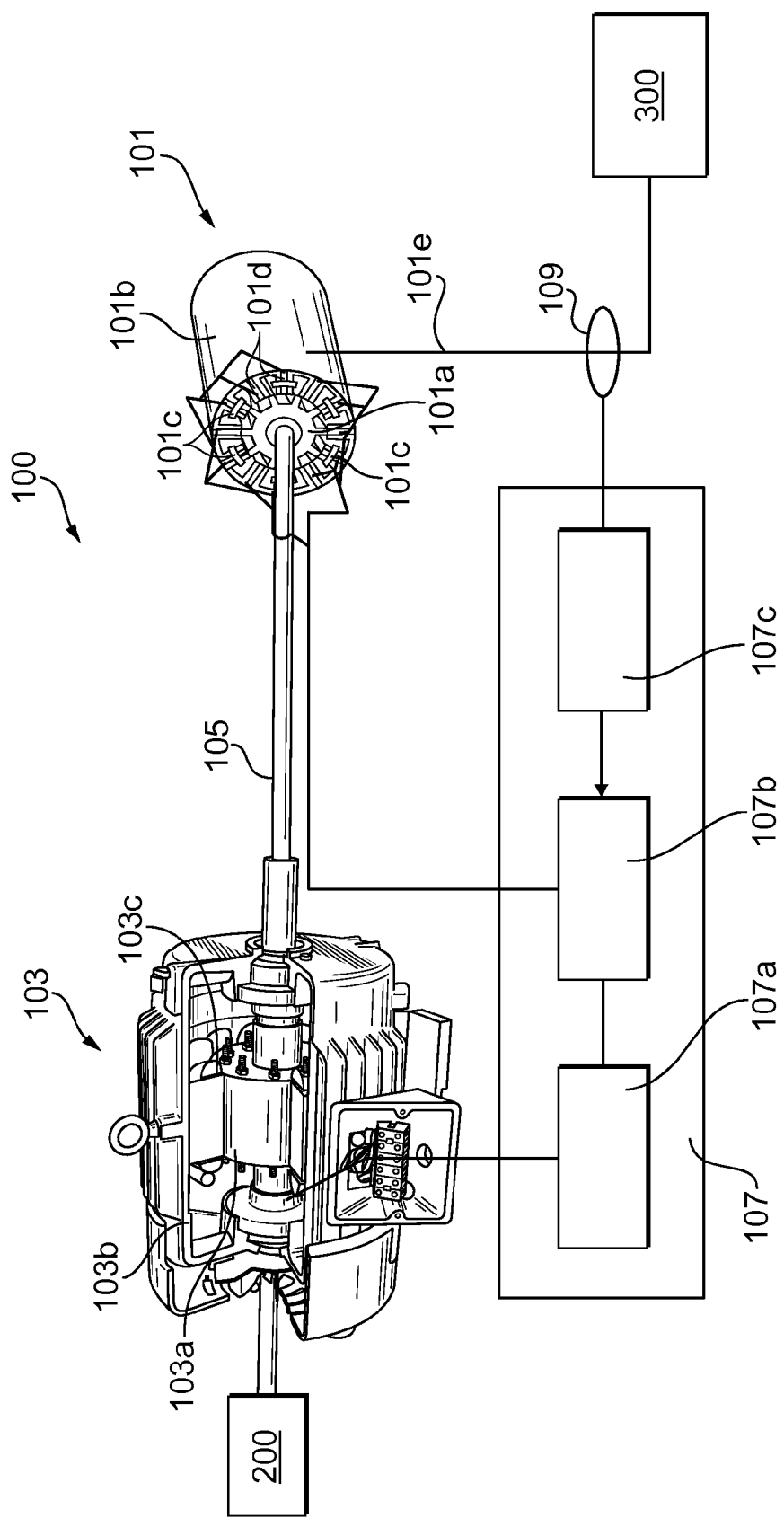
FIG. 1 is schematic diagram of an embodiment of a two stage flux switch power generation system in accordance with this disclosure.
Figure 2:
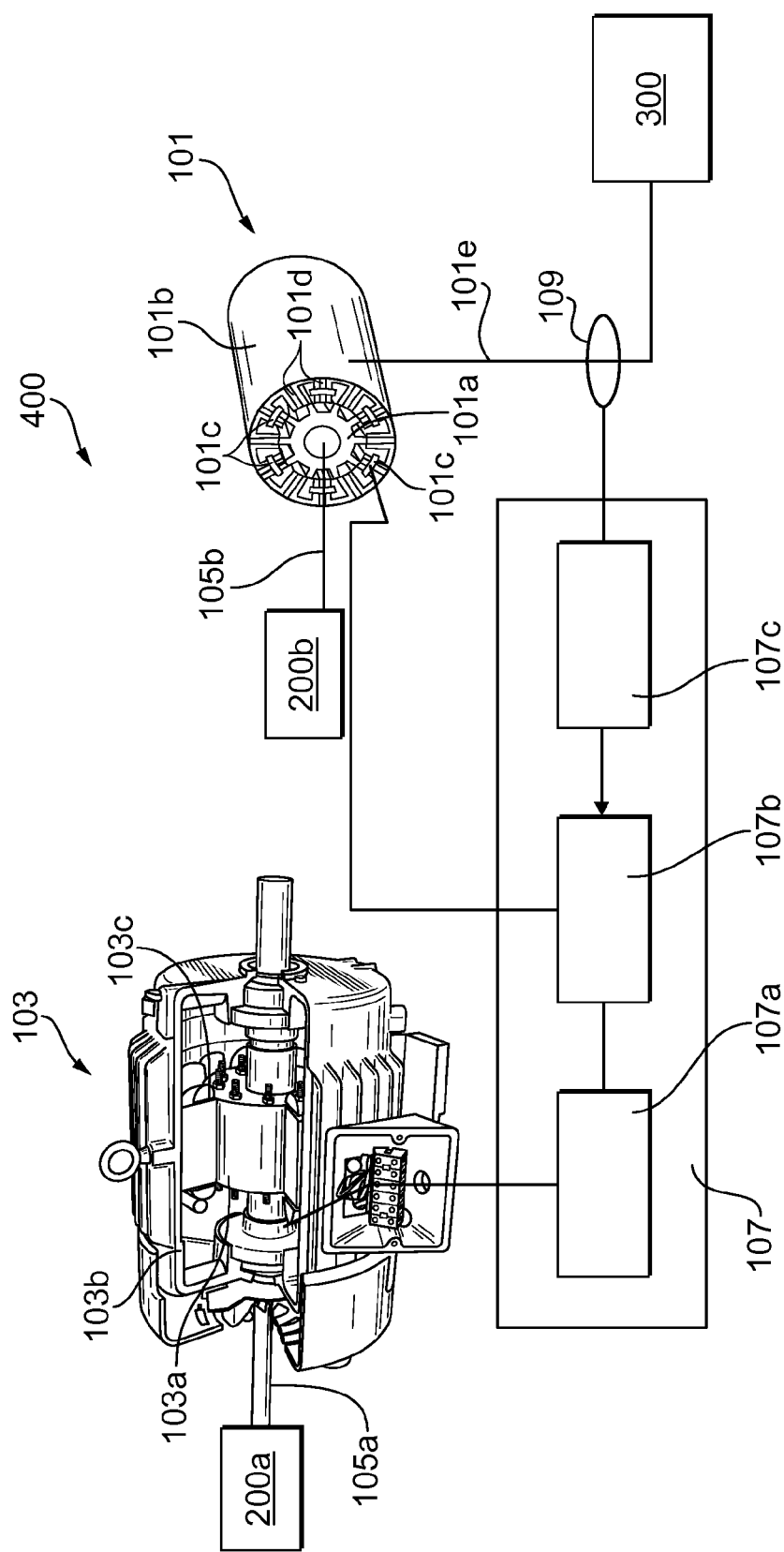
FIG. 2 is schematic diagram of another embodiment of a two stage flux switch power generation system in accordance with this disclosure.

Reference will now be made to the drawings wherein like reference numerals identify similar structural features or aspects of the subject disclosure. For purposes of explanation and illustration, and not limitation, an illustrative view of an embodiment of an electrical machine system in accordance with the disclosure is shown in FIG. 1 and is designated generally by reference character 100. Another embodiment and/or aspects thereof are shown in FIG. 2. The systems and methods described herein can be used as electrical generators (e.g., for aircraft or other suitable vehicles).

In at least one aspect of this disclosure, referring to FIG. 1, a two stage flux switch power generation system 100 includes a flux switching machine (FSM) 101 including an FSM rotor 101a and an FSM stator 101b. The FSM rotor 101a can be operatively connected to a rotatable shaft 105 and the stator 101b can be stationary and affixed to an external structure, however, it is envisioned that the FSM stator 101b can be connected to the shaft 105 and the rotor 101a can be stationary relative to an external structure.

The FSM rotor 101a can include any suitable field switching rotor such as, but not limited to, a solid metal rotor made of ferrous material (e.g., iron, steel, etc.) having a suitable plurality of poles extending therefrom. Magnets and or electromagnets need not be included on the rotor 101a.

The FSM stator 101b can include armature coils 101c and electromagnet 101d arranged in a suitable manner. In generator mode, the armature coils 101c allow a voltage to be induced therein by the rotation of the rotor 101a when the electromagnet 101d is excited, creating a magnetic field, due to the operating principles of a field switching machine. In motor mode, the armature coils 101c convert electrical current to a magnetic field in a manner causing flux switching and rotor motion. The operation of the electromagnet 101d is consistent between motor and generator mode.

The FSM includes an electrical input/output (i/o) 101e in electrical communication with the armature coils 101c of the FSM stator 101b. In a generator mode, the i/o 101e can connect to any suitable electrical system 300 (e.g., a battery, an aircraft electrical system, a vehicle electrical system). In a motor mode, i/o 101e can connect to any suitable motor controller 300.

The system 100 further includes a permanent magnet machine (PMM) 103 including a PMM rotor 103a and a PMM stator 103b. The PMM rotor 103a includes a permanent magnet. Armature coils 103c are included on the stator 103b as shown, for converting a changing magnetic field into electrical power. The system can also utilize a PMM 103, where the magnets are included in the PMM stator 103b and the armature coils are included in the PMM rotor 103a. Any suitable type of permanent magnet machine is contemplated herein (e.g., a brushless motor/generator, a field switching machine with permanent magnet for field generators).

The PMM rotor 103a (or PMM stator 103b in some embodiments) can be operatively connected to the shaft 105. The PMM 103 and/or the shaft 105 are operatively connected to one or more engines 200 such that the engines 200 can drive and/or be driven by the PMM 103 and/or the FSM 101. While the PMM 103 is shown disposed on the same shaft 105 as the FSM 101, it is envisioned that the PMM 103 can be connected to a different shaft than the FSM 101 is connected to. For example, referring to FIG. 2, system 400 can include a first shaft 105a connected to a first engine 200a and a second shaft 105b connected to a second engine 200b, the shafts 105a, 105b being mechanically independent of each other. It is also contemplated that the first shaft 105a and the second shaft 105b can be mechanically coupled in any suitable manner to one or more engines 200.

The PMM 103 is electrically connected to the FSM 101 in any suitable manner. In some embodiments, the PMM stator 101b can be electrically connected to the FSM stator 110b. For example, the PMM 103 can be electrically connected to the FSM 101 through a controller 107.

The controller 107 can include a rectifier 107a for rectifying energy between the PMM 103 and the FSM 101. The controller 107 can also include a power converter 107b for modifying the voltage and/or current of energy between the PMM 103 and the FSM 101. The power converter 107b can include a DC to DC converter for modifying the voltage input to the FSM 101. The controller 107 can further include a voltage regulator 107c operatively connected to the power converter 107b for controlling the power converter 107b voltage output.

The system 100 can include a signal sensor 109 operatively connected to the electrical i/o 101e of the FSM 101 for sensing at least one characteristic (e.g., voltage, current, frequency, phase) of a signal that is input or output from the FSM 101. The voltage regulator 107c can be connected to the sensor 109 and can be configured to control the power converter 107b based on the at least one characteristic of the signal sensed by the sensor 109.

As opposed to existing electrical machine systems, the herein disclosed embodiments allow the rectifier 107a to be stationary relative to the FSM rotor 101a such that a deletion of an exciter and rotating rectifier is realized over the prior art. In general, it is contemplated that the controller 107 and/or any component thereof can be stationary relative to the FSM rotor 101a.

In use, in generator mode, when the PMM rotor 103a is rotated by an engine 200 relative to the stator 103b, the PMM 103 produces excitation electrical energy which can be passed through controller 107 (e.g., for rectification and voltage control) and can then be supplied to electromagnet 101d of the FSM 101 to create the necessary magnetic field for the FSM 101 to produce electrical energy from the rotation of FSM rotor 101a. In embodiments where the PMM 103 and the FSM 101 are on the same shaft 105 or at least mechanically linked to the same engine 200, the rotors 103a and 101a will rotate together creating a self-sustaining generator system (as long as the engine 200 provides rotational energy to the PMM 103 and the FSM 101).

Electrical energy can then be output from the FSM 101 via electrical i/o 101e to electrical system 300. The sensor 109 can sense the electrical energy going to the electrical system 300 and provide feedback to the voltage regulator 107c to control the voltage of power converter 107b, which controls the strength of the field produced by the field magnets 101d, and ultimately controls the power output of the FSM 101 as necessary. In some situations (e.g., where an electrical fault is detected), the voltage regulator 107c can cut the excitation energy off from the FSM 101 which prevents the FSM 101 from producing any energy, rendering the generator system 100 fault safe.

In at least some embodiments, the system 100 can be configured to operate as an electric motor system such that energy can be taken from the electrical system 300 and one or both of the FSM 101 and the PMM 103 can be used to drive engine 200. This can be useful as a weight/complexity reducing means in many systems, e.g., aircraft engine starters.

The methods and systems of the present disclosure, as described above and shown in the drawings, provide for electrical machine systems with superior properties including safety during fault conditions and self-sustaining flux switching machines. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. An electrical power generation system, comprising:
   a flux switching machine (FSM) including an FSM rotor operatively connected to an FSM stator, the FSM rotor operatively connected to a shaft, wherein the FSM includes an electrical input/output (i/o) in electrical communication with the FSM stator; and
   a permanent magnet machine (PMM) including a PMM rotor operatively connected to a PMM stator, the PMM rotor operatively connected to the shaft, wherein the PMM is electrically connected to the FSM.

2. The electrical power generation system of claim 1, wherein the PMM stator is electrically connected to the FSM stator.

3. The electrical power generation system of claim 1, wherein the PMM is electrically connected to the FSM through a controller.

4. The electrical power generation system of claim 3, wherein the controller includes a rectifier for rectifying voltage between the PMM and the FSM.

5. The electrical power generation system of claim 4, wherein the controller includes a power converter operatively connected to the rectifier for modifying the voltage and/or current of energy between the PMM and the FSM.

6. The electrical power generation system of claim 5, wherein the power converter includes a DC to DC converter for modifying conditioning the voltage input to the FSM.

7. The electrical power generation system of claim 5, wherein the controller includes a voltage regulator operatively connected to the power converter for controlling the power converter voltage output.

8. The electrical power generation system of claim 7, further including a signal sensor operatively connected to the electrical i/o of the FSM for sensing at least one characteristic of a signal that is input or output from the FSM, wherein the voltage regulator is connected to the sensor and is configured to control the power converter based on the at least one characteristic of the signal.

9. The electrical machine system of claim 1, wherein the PMM includes an FSM with a permanent magnet.

10. The electrical power generation system of claim 3, wherein the controller is stationary relative to the FSM rotor.

11. An electrical power generation system, comprising:
a flux switching machine (FSM) including an FSM rotor operatively connected to an FSM stator, the FSM rotor operatively connected to a first shaft, wherein the FSM includes an electrical input/output (i/o) in electrical communication with the FSM stator; and
a permanent magnet machine (PMM) including a PMM rotor operatively connected to a PMM stator, the PMM rotor operatively connected to a second shaft, wherein the PMM is electrically connected to the FSM.

12. The electrical power generation system of claim 11, wherein the PMM stator is electrically connected to the FSM stator.

13. The electrical power generation system of claim 11, wherein the PMM is electrically connected to the FSM through a controller.

14. The electrical power generation system of claim 13, wherein the controller includes a rectifier for rectifying energy between the PMM and the FSM.

15. The electrical power generation system of claim 12, wherein the first shaft and the second shaft are mechanically coupled to each other.

* * * * *